3,682,623
COPPER REFINING PROCESS
Ludovicus Maria Dierckx, Beerse, Denis Lucian Feron, Woluwe St. Pierre, and Karel Guns, Beerse, Belgium, assignors to La Metallo-Chimique S.A., Brussels, Belgium
Filed Oct. 14, 1970, Ser. No. 80,585
Int. Cl. C22b 15/14
U.S. Cl. 75—76                                    28 Claims

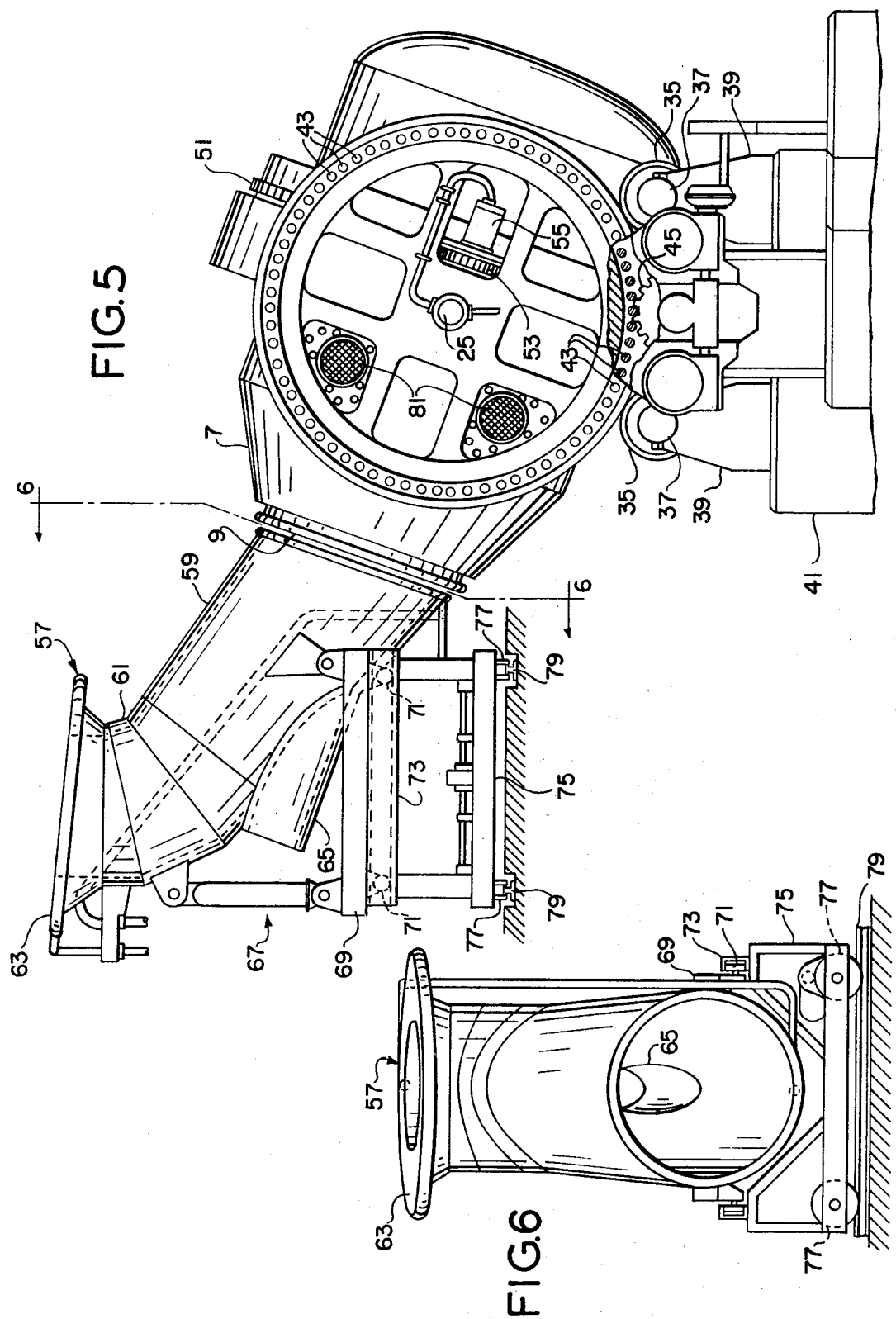

ABSTRACT OF THE DISCLOSURE

A process providing for the pyrometallurgical recovery of copper from copper-bearing material and isolation of lead/tin, nickel and zinc in economically recoverable form. Copper-bearing material is initially melted and reduced with solid material containing metallic iron to form a black copper which is refined by blowing with oxygen to oxidize metallic impurities and produce anode-grade copper. A small portion of metallic copper is oxidized in the refining step and absorbed, together with oxidized impurities, into the resulting refining slag. Copper and lead/tin are selectively and sequentially reduced from the refining slag with solid material containing metallic iron, thus producing additional black copper, which may be recycled to the refining step, and a metal rich in lead and tin. Zinc is volatilized from each step of the process and collected as zinc oxide dust, from which zinc may be readily recovered. High turbulence in each step allows rapid selective reactions at temperatures low enough to avoid substantial volatilization of lead and tin oxides. Temperatures are preferably maintained not substantially higher than the temperature at which the slags become substantially fluid. A sharp separation of copper, lead, tin and zinc into a high-grade anode copper, a rich lead/tin metal, and high-grade zinc oxide is obtained. Equipment adapted to carrying out melting, oxidation and reduction reactions is also described.

BACKGROUND OF THE INVENTION

This invention relates to pyrometallurgical recovery of copper, and more particularly to an improved process for recovery of anode-grade copper from copper-bearing materials.

Because of the industrial importance and relatively high cost of copper, the efficiency of copper refining processes is a matter of major economic significance. For the same reason, the recovery of copper from various scrap materials is a matter of particular significance and interest. Since many of the available copper-bearing materials also contain relatively high concentrations of other valuable materials such as lead, tin, nickel and zinc, the development of more efficient methods of recovering copper, along with these other essential materials, is a highly important goal.

The extraction of copper from copper ores is an ancient art. The nature of the processes used for copper extraction have depended in large part on the nature of the ore being processed. In the recovery of copper from sulfide ores, it has long been known to reduce the ore to a copper-iron sulfide matte, and then blow the matte with air in a Bessemer or rotary converter to produce blister copper.

Methods of recovering copper from copper-bearing scrap materials are also known to the art. Copper-bearing scrap normally contains other materials such as lead, tin, zinc and nickel. Since the latter materials are also valuable, an efficient copper recovery process should provide not only for separation of these materials from the copper but also for economic recovery of these materials themselves.

According to a typical conventional scrap recovery process, copper-rich materials, such as red brasses, are converted to anode copper by air oxidation of impurities in a converter furnace. The slags from this furnace are reduced in a blast furnace with coke and iron-bearing scrap. Materials such as yellow brass are also fed to this furnace. A black copper, produced in the blast furnace, is converted to anode-grade copper in another air-blown converter. Copper from the converters is cast into anodes and electrolytically refined.

Where the scrap fed to this process contains lead and tin, the latter materials are separated from the copper by oxidation and volatilization of the resultant lead and tin oxides. Thus, a "dust" containing volatilized oxides of lead and tin emanates both from the reducing furnace and the converters. Separation of lead and tin from copper by oxidation and volatilization is a common characteristic of heretofore known methods of refining copper scrap.

To effect recovery of lead and tin from copper-bearing materials, previously known processes have required collection of the dust and reduction thereof with coke or coal. Recoveries of lead and tin by such processes are not high because significant proportions of lead and tin remain in the condensed phase during any given pass through the copper recovery furnaces. Thus, recycle rates are high and yield losses inevitably result. Lead and tin recovery is further complicated if the copper-bearing materials contain zinc, as copper scrap normally does, since zinc oxide is also volatilized from the furnaces and the lead and tin oxides in the dust must be separated from the zinc oxide. The latter separation requires further reduction and volatilization of zinc or, alternatively, hydrometallurgical operations. In either case, additional labor, equipment and materials are required. If zinc content of the copper-bearing materials is too high, recovery of lead and tin simply becomes uneconomical.

Regardless of the zinc content of the scrap, it is necessary that tin and lead be present in fairly substantial quantities if they are to be recovered by known processes. Tin, e.g., should constitute approximately 5% of the scrap if economical recovery is to be realized.

Though previously known processes separate metallic lead, tin, zinc, etc. from copper according to the principle of preferential oxidation, the control of conditions is not adequate to assure highly selective reaction. Thus, substantial quantities of copper tend to be oxidized in the converters and recycled to the blast furnace or other reduction step. The high copper circulation rate which results gives rise to yield losses in the dust and reduction furnace slag and also reduces the net productive capacity of the process equipment.

There has thus been an unfulfilled need in the art for an improved process for the recovery of copper from copper-bearing materials, including scrap materials. In particular, there has been a need for a process which provides improved yields and productivity, and which provides efficient pyrometallurgical separation of lead and tin, even when the latter are present in a low concentration or when large proportions of zinc are present.

SUMMARY OF THE INVENTION

Among the several objects of the present invention, therefore, may be noted the provision of an improved process for the recovery of copper from copper-bearing materials; the provision of a process for recovery of copper in high yield from copper-bearing materials; the provision of such a process whereby high equipment throughput rates are realized; the provision of such a process whereby lead and tin contained in copper-bearing materials are pyrometallurgically recovered through condensed phase operations; the provision of such a process whereby copper, lead and tin may be recovered from copper-bearing materials of low copper, lead and tin content; the provision of such a process whereby lead and tin can be recovered from copper-bearing materials of high zinc content; the provision of such a process wherein a high-grade zinc oxide can also be recovered; and the provision of such a process whereby lead and tin may be recovered from copper-bearing scrap with minimum labor requirements. Other objects and features will be in part apparent and in part pointed out hereinatfer.

The present invention is thus directed to a process for recovering copper from copper-bearing materials which comprises the step of melting copper-bearing materials in the presence of a solid material containing metallic iron to form a melting bath including a slag phase; substantially reducing any combined copper, lead, tin or nickel contained in the said copper-bearing materials to the elemental metallic state with solid-state metallic iron in the presence of a source of silica while subjecting the melting bath to a high degree of agitation to provide substantially uniform mass distribution within each liquid phase, substantially uniform temperature distribution throughout the melting bath, and high mass transfer rates between the slag phase and the metal phase, whereby vaporization of a major proportion of any lead or tin present is avoided and a black copper and a melting slag containing iron silicate are produced; separating said melting slag from said black copper; adding silica to said black copper to form a refining bath; and blowing the black copper with oxygen while subjecting the refining bath to a high degree of agitation sufficient to provide substantially uniform mass distribution within each liquid phase, substantially uniform temperature distribution throughout the refining bath, and high mass transfer rates between the metal phase, the gas phase, and the phase containing silica, so that metallic impurities of higher oxygen affinity than copper are selectively oxidized and rapidly absorbed by the phase containing silica while vaporization of major proporitons of any lead oxide or tin oxides produced is prevented, thereby producing copper metal and a refining slag containing said impurities including a major proportion of any significant quantities of lead or tin contained in the black copper. The invention is further directed to such a process wherein the refining slag is subjected to further treatment which comprises the additional step of mixing said refining slag with a solid material containing metallic iron to form a slag recovery bath; selectively reducing combined copper contained in the slag portion of said slag recovery bath to the elemental metallic state with solid-state metallic iron while subjecting the slag recovery bath to a high degree of agitation of the character described above, thus promoting reoxidation by copper oxide of such lead or tin as may be temporarily reduced from any combined lead or tin contained in said refining slag and preventing the voltatilization of major proportion of lead or tin compounds, thereby producing a black copper and an extracted slag of low copper content; and separating said extracted slag from said black copper. Also included in the invention is such a process wherein the extracted slag contains at least one compound selected from the group consisting of lead, tin and nickel and wherein said extracted slag is subjected to further treatment which comprises the steps of mixing said extracted slag with solid materials containing metallic iron to form an extracted slag-treating bath; substantially reducing any compounds of copper, lead, tin or nickel contained in the slag portion of said extracted slag-treating bath to the elemental metallic state with solid-state metallic iron while subjecting the extracted slag-treating bath to a high degree of agitation of the character described above, thus promoting the reduction of combined lead, tin or nickel contained in the extracted slag, thereby producing a metal containing lead or tin and a spent slag containing low proportions of any copper, lead or tin contained in the refining slag; and separating the metal containing lead or tin from the spent slag. Further included in the invention is a method of recovering metals selected from the group consisting of copper, lead, tin and nickel from slags containing such metals which comprises the steps of mixing such a slag with solid materials containing metallic iron to form a bath; substantially reducing any combined copper, lead, tin or nickel contained in said slag to the elemental metallic state with solid-state metallic iron while subjecting the bath to a high degree of agitation of the character described above, whereby vaporization of a major proportion of any lead or tin present is avoided and a metal selected from the group consisting of copper, lead, tin or nickel and a depleted slag containing iron silicate are produced; and separating said metal from said depleted slag.

BRIEF DESCRIPTION OF THE DRAWINGS

FIG. 5 is a side elevation of the furnace of FIG. 3 with the furnace tilted in register with a hood; and FIG. 6 is a sectional view along the plane 6—6 of FIG. 5.

Corresponding reference characters indicate corresponding parts throughout the several views of the drawings.

DESCRIPTION OF THE PREFERRED EMBODIMENTS

The objects of the present invention are realized by following the series of steps detailed hereinbelow. An essential characteristic of each of these steps is the subjection of the reaction masses to a substantially higher degree of agitation than has heretofore been employed in copper recovery processes. By subjecting the mass to such vigorous agitation, good mass distribution is maintained within both the metal phase and the slag phase with high rates of mass transfer effectuated between gas, metal and slag. High mass transfer rates are aided by the generation of an intimately intermixed heterogeneous boundary layer between the metal and the slag. As a consequence of good mass distribution and mass transfer, rapid selective reactions take place at relatively low temperatures, allowing operation at temperatures not substantially higher than the temperatures at which the respective slags become substantially fluid, thus preventing vaporization of major proportions of lead or tin present in the form of lead or tin oxide. By way of illustration, process reactions are carried out at temperatures not substantially higher than about 1300° C., except where very high temperature melting slags are involved. A typical operating temperature for each of the operations of this process is about 1180° C. The high degree of agitation employed additionally provides substantially uniform temperature distribution throughout the reaction masses, thereby avoiding the formation of "hot spots" which would tend to promote volatilization of lead or tin oxide. Maintaining the major proportion of lead and tin in the condensed phase allows these materials to be recovered in concentrated form from the slag resulting from the copper refining step.

Figure 1:
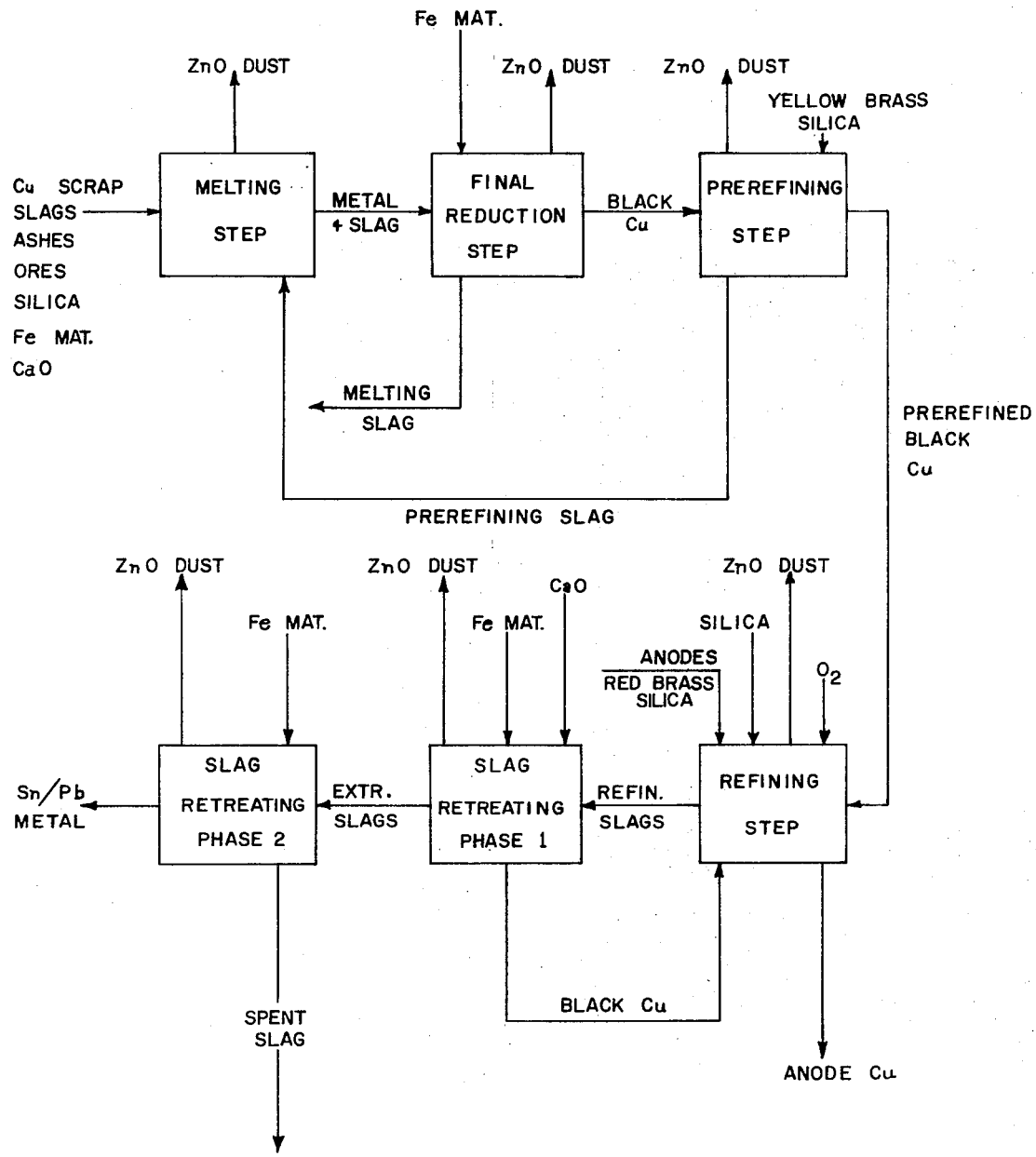
FIG. 1 is a flow sheet showing the operational scheme of the processes of this invention.

Referring to FIG. 1, copper-bearing materials (herein defined to include essentially any material containing copper, such as for example slags, ashes and scrap of either high or low copper content) are initially heated, together with solid material containing metallic iron (normally copper-iron scrap). Melting takes place in a vessel under a neutral flame with mild agitation and produces a bath, herein referred to as the melting bath, which includes a slag phase. Preferably the melting bath also contains a small proportion of an alkaline or neutral flux such as, for example, lime, borax, calcium fluoride, magnesium oxide or zinc oxide, to optimize the specific gravity and viscosity of the slag formed. If the copper-bearing material contains insufficient silica or silicate to absorb iron compounds produced in the reduction reactions, it is also necessary to add silica to the charge. As the temperature of the charge increases, chemically combined copper, lead, tin or nickel in the charge is reduced with solid-state metallic iron, forming a molten metal and a molten slag containing iron silicate. Typical process reactions include $$MeO + Fe \rightarrow FeO + Me$$
$$(MeO)_x SiO_2 + xFe \rightarrow (FeO)_x SiO_2 + xMe$$
$$xFeO + SiO_2 \rightarrow (FeO)_x SiO_2$$

where Me is copper, lead, zinc, nickel, tin, etc. Since these reactions are exothermic, reaction heat rapidly increases the temperature of the charge. After the material has melted to the point that it will flow readily along the vessel wall, agitation is increased, for example, by increasing the rotation speed of a rotatable furnace to induce high turbulence so that the chemically combined copper, lead, tin, nickel or zinc present is reduced by solid-state metallic iron, forming a black copper and a slag referred to herein as the melting slag. Throughout the reduction operation, the temperature is controlled as low as possible consistent with the maintenance of a fluid slag. Low temperature not only minimizes the vaporization of lead and tin, but limits the dissolution of solid iron in the molten copper produced. It is essential that a substantial amount of solid-state iron be present to provide rapid and complete reduction of the slag. Dissolution of iron should also be minimized to maintain high solubility of lead and tin in the black copper produced. Under the aforementioned conditions, the major proportion of lead, tin and nickel contained in the copper-bearing material is concentrated in the black copper, while the major proportion of zinc is volatilized, oxidized in the exhaust system by air, and recovered as zinc oxide in a dust collecting system.

As the reduction reactions proceed, the metal phase separates out below the slag phase, and the solid iron-bearing material gradually dissolves in the molten metal, even at the low temperatures which are preferably used. To insure the maximum recovery of copper, lead and tin from the charge, additional solid material containing metallic iron may advantageously be added after melting is complete to effect final reduction of copper, tin, lead and zinc remaining in the slag. After final reduction, the melting slag is drawn off and removed from the process. Since the purpose of the melting operation is to completely reduce chemically combined copper, tin and lead in the scrap, an excess of iron is used which remains in the black copper. Though zinc is volatilized out of the furnace throughout the melting operation, a considerable amount of this material also remains in the black copper at the end of the melting step.

If the melting and reduction steps are carried out in a vessel separate from the vessel wherein the black copper is refined, it may be desirable to prerefine the black copper before transferring it to the refining vessel. To prerefine the black copper, a flux such as silica is mixed therewith to produce a prerefining bath, and the bath is subjected to vigorous agitation under an oxidizing flame. A substantial proportion of such zinc and iron as the black copper may contain is oxidized. Some copper, lead and tin are also oxidized and slagged. This slag, referred to herein as the prerefining slag, is recycled to the succeeding melting batch. Metallic scrap, e.g., yellow brass or nonmagnetic shredding scrap, may be added to absorb the heat of reaction.

The black copper is refined to anode-grade copper by blowing it with oxygen to selectively oxidize metallic impurities such as iron, zinc, lead, tin, nickel, etc. A flux such as silica is added to adsorb the oxides of metallic impurities produced by the oxygen blowing, the mixture of flux and black copper being referred to herein as the refining bath. By maintaining a high level of agitation of the refining bath during blowing, highly selective oxidation is achieved and the major proportion of any significant quantities of lead and tin contained in the black copper may be recovered in the siliceous slag, referred to herein as the refining slag. In a preferred embodiment of this invention, oxygen blowing is conducted in successive steps with refining slags being withdrawn and copper-rich materials, such as red brass, and additional silica being added between steps. The periodic addition of cold silica and red brass helps control temperature which otherwise tends to increase due to the highly exothermic refining reactions.

Copper metal of anode-grade quality is routinely produced in the refining step. Copper metal of lesser purity can, of course, be produced if desired by simply curtailing the blowing operation. Normally the copper metal produced is cast into anodes and electrolytically refined to yield a copper of high purity.

The refining slag (or slags) contains a major proportion of whatever lead and tin are contained in the scrap as well as a fair amount of copper. In a preferred embodiment of this invention, therefore, the refining slag is treated to recover lead, tin and additional copper. To effect such recovery, the molten slag is contacted with a solid material containing metallic iron to form a mixture referred to herein as the slag recovery bath. A high state of agitation in the slag recovery bath is maintained and the solid-state iron reacts with the oxides and silicates in the slag, reducing copper, lead and tin to the elemental metallic state. By initially adding a quantity of metallic iron which does not substantially stoichiometrically exceed the amount of copper oxide in the slag, and by maintaining a high level of agitation, copper can be selectively reduced from the refining slag, producing a black copper which is suitable for recycle to the refining step and leaving a slag referred to herein as the extracted slag. After separation of the black copper from the extracted slag, lead and tin may be recovered from the extracted slag by reduction with further iron-bearing material while subjecting the slag/iron material mixture, herein referred to as the extracted slag treating bath, to a high degree of agitation. A metal rich in lead and tin is thereby produced, leaving a slag referred to herein as the spent slag. The metal containing tin and lead, with some copper and nickel, is treated for recovery of tin and lead. Copper and nickel are recycled to the melting furnace.

The processes of this invention, as outlined above, require substantially lower capital and labor costs than do previously known processes for recovering copper, zinc, lead and tin from scrap materials. Several significant factors combine to provide these major advantages. Condensed phase pyrometallurgical recovery of lead and tin avoids the necessity of expensive dust recovery and hydrometallurgical facilities for extracting lead and tin from the dust. Selective reactions avoid the necessity of large recycle streams. This latter factor, combined with rapid reaction rates, provides substantially improved net throughputs for process equipment. And all slags are handled in the molten state, avoiding both labor inefficiencies and any need for the slag crushing facilities frequently required by prior art processes wherein slags were allowed to solidify.

Energy efficiencies are also improved in the processes of this invention. The handling of slags in molten form is one major contributor to this result. Relatively low recycle rates resulting from selective reaction also contribute to energy efficiency. Intimate contact between gaseous and condensed phases causes gases to leave at relatively low temperatures, further contributing to efficient utilization of energy. This latter factor also avoids the need for waste heat boilers etc., which further reduces capital, maintenance and labor costs. The generally low temperatures at which operations are conducted minimize heat losses to the surroundings. Finally, the addition of cold materials to control temperatures utilizes the heat of process reactions to effect melting and thus promotes still greater energy efficiency.

The processes of the present invention are capable of recovering copper, tin and lead from a variety of different scrap materials. As noted above, for example, copper, tin and lead may be recovered from scrap mixes which contain relatively low quantities of copper, lead, and tin and large amounts of zinc. High proportions of zinc can be accommodated without seriously affecting lead and tin recovery, since copper, lead and tin are maintained in the condensed phase while zinc is not. Small concentrations of copper, lead and tin are recoverable for the same reason and, in the case of lead and tin, because lead and tin are progressively concentrated through the process, until they are recovered from the extracted slag.

Illustrative of the copper-bearing materials which may be treated according to the present invention are the following:

Red copper scrap. This is a very high grade of copper scrap, typically containing 93–99% copper. Because of its high purity, this material does not need to undergo iron reduction and is normally added as a coolant during the refining step. Typical red copper scrap would include wire, tubing, beryllium alloys, etc.

Red brass scrap. These brasses contain relatively low quantities of zinc. They are also fed into the process at the refining step. Though they could, of course, be fed during the melting or reduction step, this is unnecessary and would adversely affect the capacity for reducing oxidized or other combined metals in a given size process vessel. Red brass scrap is found in auto radiators, machinery bearings, valves, rail car boxes, turnings, etc.

Yellow brass. These brasses contain relatively large proportions of zinc. If a prerefining step is employed, yellow brass is conveniently fed at that point; otherwise it is preferably fed to the refining step. Yellow brass is found in the form of miscellaneous castings, condenser tubes, cuttings, turnings, etc.

Copper slags and residues. These are the oxidized materials which are melted and reduced with iron. They include slags from refining operations, tin slags, lead slags, slags and dross from brass ingot makers and secondary melters, high tin content solder refining dross, copper, lead and tin mattes, burnt ashes, copper ores, residues, furnace dust, ashes, etc.

Iron-bearing copper scrap. These materials are generally used as the source of iron for the initial reduction operation and for the reduction of copper from the refining slag and lead/tin from the extract slag. Other sources of iron may, of course, be used but iron-bearing copper scrap is obviously best adapted for a process whose principal object is the recovery of copper. Iron-bearing copper scrap may be found in the form of armatures, fields, motor parts, iron armored wire, etc. Scrap materials are also available which have a high iron and a low copper content.

As noted, the above list of materials is illustrative only, and in no way exhaustive. Almost any material which will not burn uncontrollably, explode or otherwise damage process equipment can be included in the copper-bearing materials fed to the processes of this invention. For example, various metal silicates, chlorides, fluorides, sulfates, sulfides, etc., may be charged. All the various types of copper ores can be processed. Metals of higher nobility than copper will be concentrated in the copper metal produced and must be recovered therefrom by further processing unrelated to this invention but well known to the art.

Since the processes of this invention are generally carried out at temperatures at which the various slags involved are fluid, process operations are preferably conducted in one or more furnaces. A furnace which is particularly useful in carrying out the above-described process is illustrated in FIGS. 3–6. This furnace is constituted by a vessel 1 having a cylindrical wall 3, a circular bottom 5 and a frustoconical upper end 7 open at the top to provide an open mouth as indicated at 9 in FIG. 3. More particularly, the furnace or vessel 1 comprises a steel inner shell 11 having a refractory lining 13, and a steel jacket 15 surrounding and spaced from the shell 11. The space between the shell and the jacket is designated 17. A bottom tap hole is indicated at 19. The furnace 1 is rotary on its cylindrical axis within a ring 21 mounted for swinging movement about a horizontal axis coincident with a diameter of the ring so that the furnace may be pivoted between an upright position and a tilted position. The ring has trunnions 23 and 25 extending horizontally outward therefrom at diametrically opposite points on the ring. Trunnion 23 is journalled in a bearing 27 on a post 29 on a footing 31. Trunnion 25 has a relatively large lantern gear wheel 33 secured on its outer end, this wheel being mounted for rotation on a horizontal axis by being cradled in a pair of cradle rollers 35 each journalled in a bearing 37 on a post 39 on a footing 41. The pins of the lantern gear wheel are indicated at 43. Between the cradle rollers is a drive pinion 45 in mesh with the lantern gear pins 43 and adapted to be driven by suitable drive means such as indicated at 47 for rotating the lantern gear wheel 33 to pivot the ring 21 on the horizontal axis of the lantern gear wheel and trunnions 23 and 25.

The furnace 1 has a peripheral ring 49 surrounding and secured to its jacket 15 by means of which it is mounted for rotation on its cylindric axis in ring 21. Ring 49 is provided with a clear ring gear 51. A pinion 53 in mesh with gear 51 is driven by a motor 55 for rotating the furnace on its axis. The motor and pinion are carried by and rotate with the gear wheel 33 about its axis.

The degree of agitation required throughout the process of this invention may be practically achieved by rapid rotation of a rotatable furnace of the above-described type. In the discussion which follows, the necessary agitation is described by reference to particular rotating speeds of a given-size furnace of this type. As noted above, the required degree of agitation is most fundamentally described as that which is sufficient to provide substantailly uniform mass distribution within each liquid phase, substantially uniform temperature distribution throughout the melting bath, and high rates of mass transfer between phases. It will thus be understood by those skilled in the art that the furnace speeds specified are illustrative only and that different speeds may be appropriate and useful in furnaces of different design. Even where furnaces of the above-described type are used, the required rotating speed will vary according to the size of the particular furnace which is employed. It may be noted that a practical method of insuring that the furnace is operating at sufficient speed is to increase the furnace speed until the molten bath is carried up the furnace wall and cascades back down in the manner of a waterfall.

Figure 2:
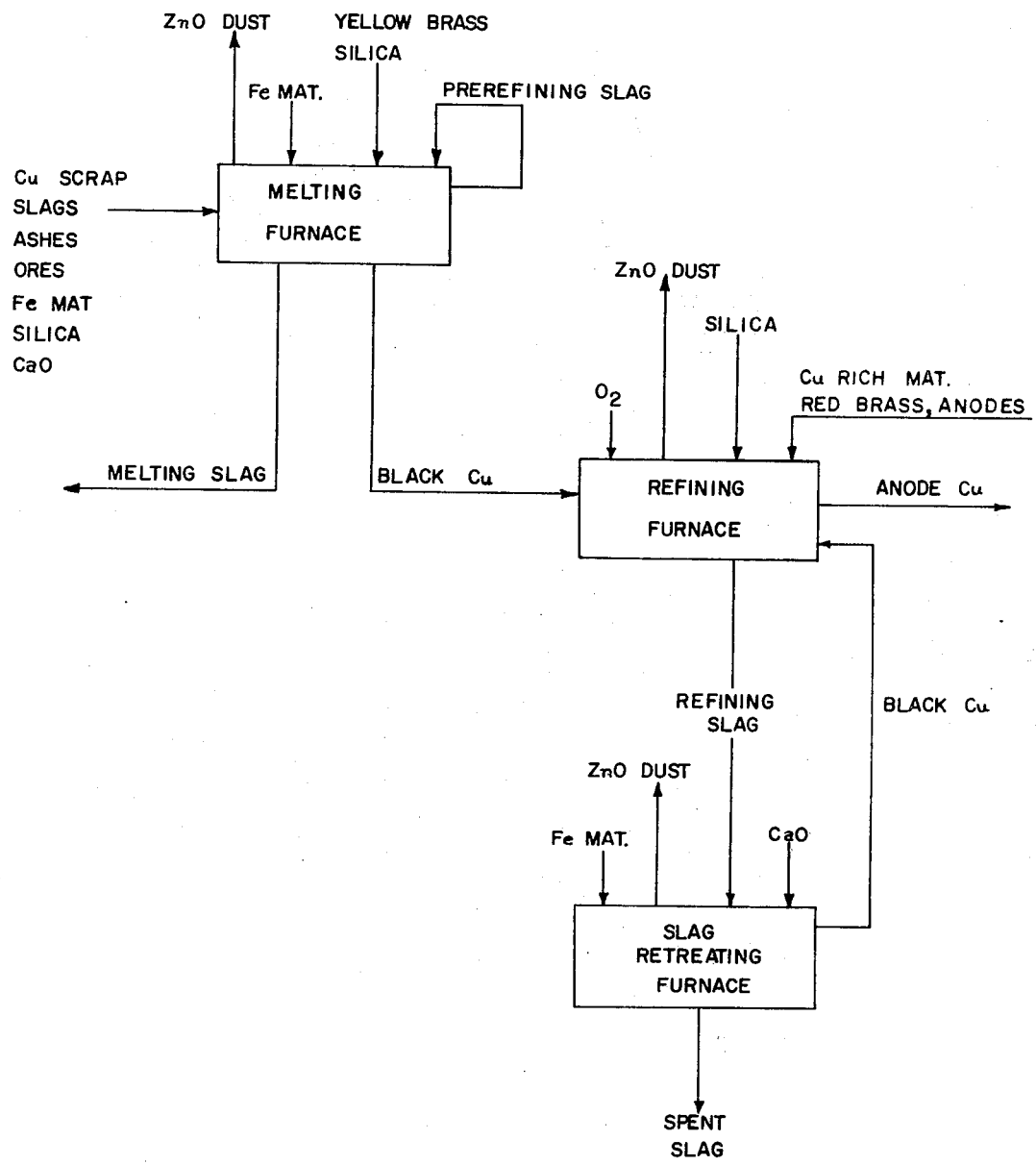
FIG. 2 is a flow sheet showing the equipment arrangement in a preferred embodiment of this invention.
Figure 3:
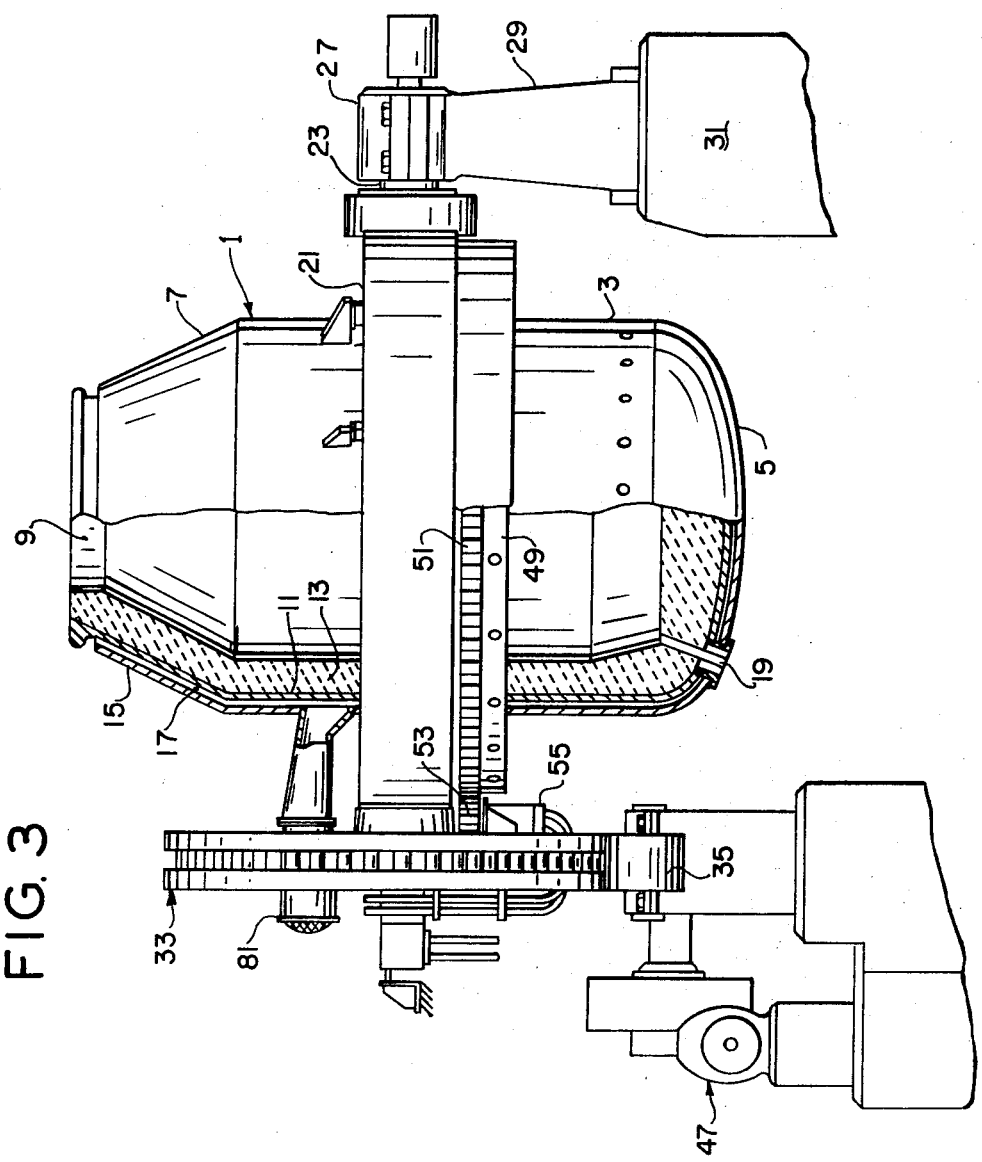
FIG. 3 is a front elevation of a furnace particularly useful in carrying out this invention.
Figure 4:
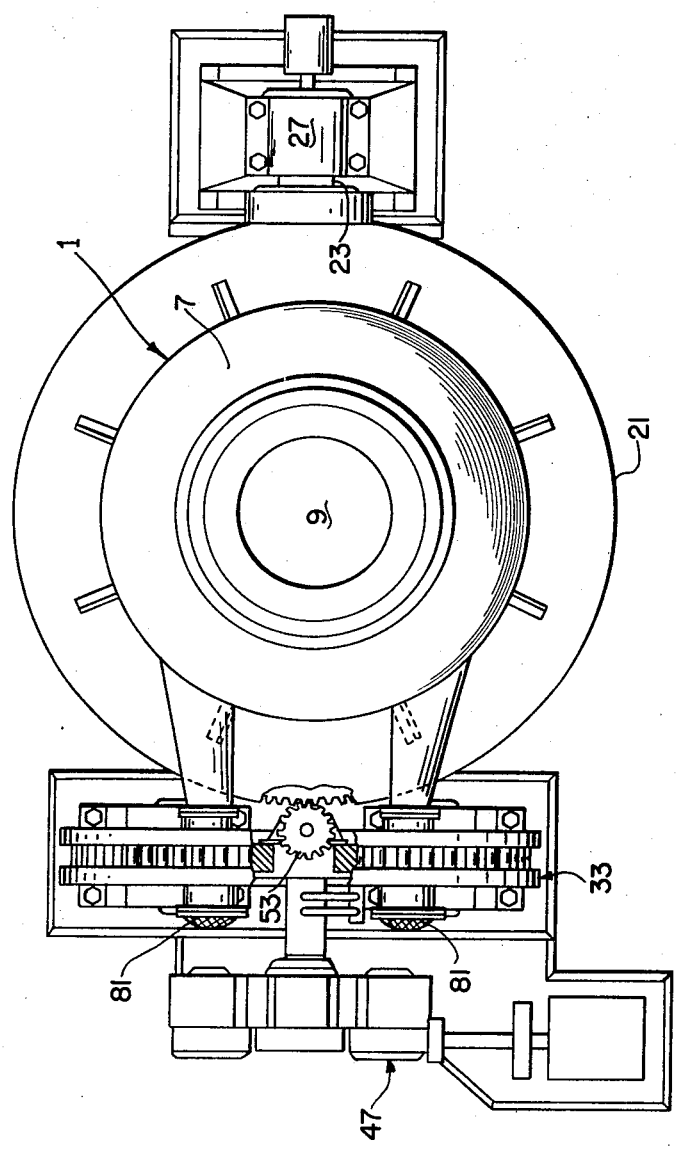
FIG. 4 is a plan view of the furnace of FIG. 3.

In preferred embodiment of the present invention, three furnaces of the above-described type are employed. Such an arrangement is depicted in FIG. 2. Scrap materials are melted and reduced with solid iron in the melting furnace. If a prerefining step is used, it also takes place in the melting furnace. Black copper, produced in the melting furnace, is mixed with flux and blown with oxygen to oxidize metallic impurities in the refining furnace. Refining slags are accumulated, then treated with iron-bearing materials in the slag retreating furnace to produce a black copper which is recycled to the refining furnace. An extracted slag remains in the slag retreating furnace which is contacted with more iron-bearing material to reduce lead and tin and form a metal rich in lead and tin, leaving a spent slag. The lead/tin metal may be treated to separate copper and nickel from the tin and lead. Copper and nickel are recycled to the melting furnace.

A typical charge mixture for the melting furnace includes slags and dross derived from other metallurgical processes, ashes (conveniently in briquette form), burnt lime flux (often compounded with ashes to form the briquettes), copper and nickel alloys, and recycled prerefining slags from a previous batch. These materials may be fed in widely varying proportions with fully satisfactory results. Iron-bearing material, normally copper/iron scrap, is also included in the initial charge. Heat is applied during the charging period but melting should be avoided. If any melting takes place during charging, solid materials may agglomerate into large chunks which can damage the refractory or overtorque the furnace drive.

The charge is melted under an oxygen enriched neutral flame while the furnace is rotated slowly, e.g., at about 1–3 r.p.m. for a furnace having an inside diameter of 10'6" and a height of 21'. The furnace should not be rotated too rapidly during the melting period, since the charge exerts a high drag on the furnace wall which would result in excessive torque on the drive mechanism if high furnace speeds were attempted. As the mass become more fluid, the coefficient of friction between the charge and the furnace wall drops and the furnace speed may be increased without overtorquing the drive. Thus, when the melting bath is visibly "gliding" or "swimming" in the furnace, rotation speed typically is increased to about 3 r.p.m. On further melting, the rotation rate is increased to about 7 r.p.m. (preferably to about 15–18 r.p.m.) where a furnace with the above dimensions is used.

As the temperature of the charge increases, hot solid material containing metallic iron reacts with hot solid oxides, silicates, and the other compounds of metals having a lower affinity for oxygen than iron, to yield a melt containing the latter metals in elemental form. Typical reactions include:

$$MeO + Fe \rightarrow FeO + Me + cal.$$

$$(MeO)_xSiO_2 + xFe \rightarrow (FeO)_xSiO_2 + xMe + cal.$$

The temperature of the melting bath continues to rise through absorption of the exothermic heat of reaction and the heat from combustion of fuel in the furnace until both slag and cupriferous metal are completely molten. The fuel supply must be regulated to prevent the temperature of the reaction mass from exceeding about 1300° C. for any substantial period during the melting furnace cycle. Preferably, the temperature should be maintained not substantially higher than the temperature at which the slag becomes substantially fluid. A bath tmperature of about 1180° C. is satisfactory for normal charge materials, but lower temperatures may be employed if borax, e.g., is used as a fluxing agent.

Each of the reduction reactions which takes place in the melting furnace is reversible. Thus, the conversion realized through each reaction is limited by the equilibria defined in relationships such as the following:

$$K_1 = \frac{[FeO][Me]}{[MeO][Fe]}$$

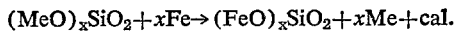

$$K_2 = \frac{[(FeO)_xSiO_2][Me]^x}{[(MeO)_xSiO_2][Fe]^x}$$

In the case where Me is copper, $K_1$ and $K_2$ are high at normal reaction temperatures and reduction of copper compounds thus proceeds substantially to completion. In the case of lead and tin, $K_1$ and $K_2$ are both relatively low, but copper in the metal phase extracts metallic lead and tin from the slag reaction zone, thereby lowering the activities of these metals in the slag and driving the reduction of combined lead and tin to completion. To avoid reoxidation of these metals, a reducing atmosphere should be maintained in the melting furnace until after the melting slag has been poured.

The vapor pressure of zinc is relatively high at the preferred reaction temperature and a major proportion of zinc, in contrast to lead and tin, is volatilized out of the furnace. Zinc vapors leaving the furnace are oxidized by air aspirated between the furnace mouth and the hood. The resultant zinc oxide dust is condensed and collected by means of conventional dust collecting systems.

Preferably, the copper, tin and lead content of the melting slag are each reduced to about 0.1% by weight or less. Should a sample indicate the presence of larger quantities of these metals remaining in the slag after the charge is completely molten, additional solid material containing metallic iron, preferably copper/iron scrap, may be charged to effect further reduction of the slag. If final reduction is to proceed, it is, of course, necessary that the slag not be saturated with iron. To assure efficient final reduction, there should be sufficient silica present that oxidized iron is predominantly in the form of $(FeO)_2SiO_2$ (fayalite). Since a certain proportion of the silica is usually combined with fluxes such as CaO, MgO and ZnO, the total equivalent $SiO_2$ present should be somewhat greater than one-half mole per mole of FeO. Thus, the slag, which typically contains 40–45% by weight FeO, should contain about 22–28% by weight of silica or silicate calculated as silicon dioxide.

Final reduction of the melting slag takes place while slag, metal and solid iron-bearing material are subjected to strong agitation under a neutral to slightly reducing flame. If a furnace of the type and size described above is used, a furnace speed of at least 12 r.p.m., preferably 20–22 r.p.m., is required. To avoid volatilization of lead and tin, operating temperature is preferably as low as possible, consistent with maintaining the slag in the molten state. Though temperatures of up to about 1300° C. may be tolerated without serious adverse consequences, the benefits of final reduction may obviously be lost if more lead and tin is vaporized than is reduced from the slag. Preferred operating temperature in this step is just above the melting point of the slag, e.g., 1180° C.

During the entire reduction operation, it is important that the melt contain sufficient copper to act as a solvent for such lead and tin as is reduced from the slag. In the final reduction step, it is highly preferable that copper/iron scrap be used as the reducing agent to provide in situ extraction of lead and tin from the slag. As noted above, the specific gravity differential between slag and metal is generally so large that the metal phase settles out, despite the strong agitation to which the reaction mass is subjected. Though strong agitation still promotes high mass transfer coefficients by producing an intimately intermixed heterogeneous boundary layer, the metal phase is often nearly saturated with lead and tin by the time the final reduction step is reached. The ability of the main mass of copper to extract tin from the slag at this point is therefore limited. Unless quick removal of elemental metallic lead and tin from the slag is facilitated in some way, as by the use of copper/iron scrap for final reduction, the lead and tin formed in the final reduction are highly susceptible to reoxidation.

When the proper proportions of silica and solid copper/iron scrap are present, and strong agitation is maintained, the melting slag may be reduced to the extent that it contains only about 0.10% copper, 0.05% lead, and 0.05% tin. This constitutes only about one-tenth the concentrations of metals normally found in slags discarded from prior art processes. It is to be noted, moreover, that the novel slag reduction method of this invention can be used to advantage in processes other than that described herein. This step would be very useful, for example, in recovering residual values from the slags of a matte smelting process. Thus, essentially any slag containing copper, lead, tin or nickel, even in relatively small proportions, may be reduced by mixing such slag with a solid material containing metallic iron and subjecting the resulting bath to the degree of agitation employed in this process as described above. The desired metals are recovered in the elemental metallic form without vaporization of a major proportion of any lead or tin present, leaving a depleted slag containing iron silicate.

After final reduction is complete, the melting slag is poured off. Conveniently, it may be passed down a launder and granulated by immersion in a flowing stream of water.

The black copper remaining in the furnace at this point typically contains 75–80% copper, though the copper content may be higher or lower depending on the composition of the initial furnace charge. The black copper often contains significant quantities of iron and zinc as well. It is usually advantageous to conduct a prerefining operation in the melting furnace. By carrying out such a prerefining operation, the melting furnace cycle and the refining furnace cycle are more closely matched and the overall productivity of the process equipment is maximized.

To carry out the prerefining step, silica and additional burnt lime are charged to the furnace and the resultant prerefining bath subjected to a high degree of agitation under a strongly oxidizing flame. Typically, a furnace of the above-noted size is rotated at at least about 12 r.p.m., preferably at about 20–22 r.p.m., to provide the desired degree of agitation. The operating temperature should be maintained below about 1300° C., preferably at a temperature not substantially higher than the temperature at which the slag becomes substantially fluid. The normal operating temperature is about 1180° C. Iron is oxidized and slagged. Zinc is primarily volatilized and oxidized above the bath level, through some zinc oxide is also formed in the bath and slagged.

If yellow brass scraps are to be processed, it is most convenient to add them to the melting furnace during the prerefining stage. Since yellow brasses contain essentially no oxidized material, it is unnecessary to add them earlier than the prerefining stage. At the same time, since yellow brasses contain substantial proportions of zinc, it is advantageous to subject them to prerefining and thus reduce both the batch cycle and oxygen consumption of the refining furnace operation. Heat generated by oxidizing iron is used for melting the additional yellow brass.

By virtue of prerefining, a black copper containing 75–80% copper can be upgraded to about 85% copper or higher, depending in part on the quantity of yellow brass used. Iron is substantially eliminated from the black copper as is a large share of the zinc. A prerefining slag is produced which contains appreciable amounts of copper and is, therefore, recycled to the next melting furnace batch. The black copper is poured into the refining furnace.

The refining furnace charge, also referred to herein as the refining bath, includes black copper from the melting furnace, black copper from the slag retreating furnace, and silica. Typically the charge also contains radiators or other cold red brass material. The proportions of copper-bearing materials may be varied widely and are in no way critical. The amount of silica which must be charged depends on the amount of metallic impurities to be oxidized and slagged off. Sufficient silica should be charged so that the slag produced contains at least about 20% by weight free silicon dioxide. Oxides of metallic impurities are rapidly converted to silicates when free silica is present in the indicated proportions. Conversion of these metallic oxides to silicates not only promotes rapid and complete reaction in the refining furnace, but is important for the subsequent slag retreating operation as well. Silicates in the refining slags are rapidly and readily reduced by solid iron, but the activation energies required for reduction of free oxide are much higher. If the slag contains significant quantities of free oxides, the productivity of the slag retreating step is reduced.

If the refining furnace charge contains significant quantities of iron, care must also be taken to charge enough silica to prevent the refining slag from becoming saturated with iron. Saturation of the slag with iron also adversely affects the slag retreating steps.

Refining furnace capacity may be maximized and furnace temperature control optimized by conducting oxygen blowing in several successive relatively short periods, between which slags are withdrawn and additional cold materials (silica and red scrap) are added. In this case, the quantity of silica which must be added prior to a particular blowing period need only be sufficient to absorb the oxides of metallic impurities produced in that period while maintaining a minimum proportion of free silica. Free silica typically constitutes at least about 20% by weight of the early slags but may be somewhat less during the final blow. The minimum silica charge required at any step of the refining furnace operation is, therefore, a function of the planned blowing rate and length of the succeeding blowing period.

Where the refining furnace charge includes cold materials such as red brass, the charge is completely melted down under a strong oxidizing flame. A high degree of agitation is maintained with rotation of a furnace of the aforementioned size, typically increased to at least about 12 r.p.m., preferably 20–25 r.p.m., after the charge is sufficiently fluid that drag of the refining both on the furnace wall does not result in excessive torque on the furnace drive. The refining bath is heated to a temperature which is preferably not substantially higher than the temperature at which the slag becomes substantially fluid, e.g., 1180° C. Unless a very high melting slag is obtained, temperature of the bath should not substantially exceed about 1300° C.

A large proportion of such zinc as may be present is volatilized, oxidized above the bath level, and carried out of the furnace during melting. Another significant proportion of zinc is absorbed by the silica flux to form a slag phase containing zinc silicate. If there is iron present in the furnace charge it is also oxidized and slagged during melting. In a preferred embodiment of this invention, the slag produced on melting the refining furnace charge is withdrawn and sent to the slag retreating furnace as the first of several refining slags to be there processed.

After withdrawal of the first refining slag, additional silica and red scrap are added to the refining furnace. At this point oxygen blowing is commenced while the furnace is rotated at a speed sufficient to induce high turbulence, e.g., at least 12 r.p.m., preferably 20–25 r.p.m. for a furnace of the above-described size. The intimate gas/slag/metal contact resulting from high turbulence promotes rapid selective oxidation of metallic impurities and reduction of any oxidized copper formed by reaction with such impurities. The oxygen blowing rate is not critical but is preferably the maximum rate consistent with efficient utilization of oxygen. The length and number of oxygen blowings are selected to balance furnace payload and temperature control with furnace cycle, taking into account the proportion of impurities present in the charge. A large number of short blowing periods allows closer temperature control and also a larger payload, since less furnace space is required for silica and slags. A small number of longer blowing periods, on the other hand, provides a shorter refining cycle. Since lower temperatures provide more favorable reaction equilibria and less refractory wear, the length of blowing periods is preferably limited to maintain the furnace temperature between about 1100° C. and about 1280° C.

If the refining furnace charge, including black copper and scrap, contains 80% copper, for example, four oxygen blowing periods might typically be used. Five refining slags would be removed, the first slag being removed after melting, the remaining slags after each blowing period. The early slags are typically rich in zinc, the middle slags rich is lead and tin, and the terminal slags rich in copper. Regardless of how many blowing periods are employed, blowing is continued until the metal is slightly overblown, preferably to the point where it contains about 5% cuprous oxide. After the last slag is poured off, the copper is poled according to conventional techniques and the resultant anode-grade copper is cast into anodes for electrolytic refining. Most of the nickel which may be contained in the scrap leaves the process as an impurity in the anode copper. Salts of this nickel are conveniently recovered from the spent electrolyte from electrolytic refining.

Strong agitation of the melt provides intimate contact between slag, metal, and oxygen, resulting in high mass transfer rates between phases. High mass transfer rates in turn promote efficient utilization of oxygen and rapid absorption into the slag of those metal oxides which have appreciable solubilities in molten copper. By assuring uniform mass distribution within each phase, vigorous agitation also promotes conversion of lead and tin oxides to the corresponding less volatile silicates and the reduction of any oxidized copper by metallic impurities of higher oxygen affinity. Thus, the following reaction proceeds:

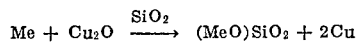

$$Me + Cu_2O \xrightarrow{SiO_2} (MeO)SiO_2 + 2Cu$$

The net effect of strong agitation, therefore, is to provide rapid selective oxidation of impurities and retention of lead and tin in the refining slags.

The accumulated refining slags are transferred to the slag retreating furnace for recovery of copper, lead and tin contained in the slags. Processing in the slag retreating furnace is of essentially the same character as in the melting furnace. As noted above, in processes previously known to the art, refining slags were simply recycled to the melting operation for recovery of copper lead and tin, along with zinc, being driven off as vapor and recovered as dust. By use of a separate step for treating refining slags, the process of the present invention effects pyrometallurgical separation of lead and tin, in the condensed phase, from the copper and nickel. In this step, as throughout the process of this invention, a high degree of agitation allows the use of working temperatures which are low enough to suppress volatilization of lead and tin oxides.

Solid material containing metallic iron and burnt lime are added to the slag retreating furnace, along with the refining slags, producing a slag recovery bath. As noted, the refining slags contain not only lead and tin but also significant quantities of copper. To allow separation of copper from lead and tin, the initial charge should contain just enough metallic iron to reduce the oxides of copper in the slags, i.e., the iron charge should be substantially stoichiometrically equivalent to the copper oxides present.

The first phase of the slag retreating furnace operation is thus directed to the selective reduction of copper from the refining slags. A neutral to slightly reducing flame is used and high turbulence is maintained, e.g., by rotating a furnace of the above-described size, at at least 10 r.p.m., preferably at 18–22 r.p.m., thus promoting selective reduction of copper. Some lead and tin are inevitably reduced during this step but intimate metal/slag contact promotes reoxidation of temporarily reduced lead and tin by reaction with copper oxide. The temperature is preferably controlled just above the melting temperature of the slag, normally at about 1180° C. By keeping the temperature as low as possible, preferably not substantially higher than the temperature at which the slag becomes substantially fluid, reduction rates and volatilization rates of tin and lead are low.

After the copper reduction phase is complete, the furnace is bottom-tapped to remove a black copper, leaving an extracted slag containing the major share of lead and tin from the refining slags. Additional material containing metallic iron is added at this point to reduce lead, tin and residual copper. The iron-bearing material added here should contain as little copper or other contaminants as possible. It may, of course, contain significant quantities of lead or tin without adverse effect. The temperature of the extracted slag recovery bath is critical during the reduction of lead and tin, as it is throughout the process if excessive volatilization of lead and tin is to be avoided. Preferably the temperature should be maintained not substantially higher than the temperature at which the slag becomes substantially fluid. Unless the extracted slag has an unusually high melting point, the slag recovery bath temperature should be maintained below about 1300° C., with a normal operating temperature being about 1180° C. Strong agitation should be maintained in order to promote fast reactions. The furnace atmosphere should be strongly reducing to avoid reoxidation of lead and tin.

After lead and tin reduction is complete, the resulting spent slag is poured off and lead/tin metal is poured off for further processing.

The following examples illustrate the invention. Throughout the examples a 10'6" I.D. x.21' furnace of the above-described type was used.

Example 1

Five metric tons of prerefining slags from a previous heat were poured into a melting furnace. Four tons of recycled copper and nickel alloys, 20 tons of briquetted ashes, 7 tons of slags derived from other processes, 1 ton of slag skulls and 10 tons of copper/iron scrap were also charged. Burnt lime constituted about 10% of the briquettes which were charged. The charge was introduced in the following order:

(1) 6 tons of liquid prerefining slags plus skulls
(2) 4 tons of recycled copper-nickel alloy and 2 tons of briquetted ashes
(3) 6 tons of briquetted ashes
(4) 7 tons of copper/iron scrap
(5) 7 tons of other slags
(6) 6 tons of briquetted ashes
(7) 3 tons of copper/iron scrap
(8) 6 tons of briquetted ashes.

Composition of the charge is shown in Table I.

TABLE I

| Metal/ flux | Cupro alloy, 4,000 kg. | | Recycled slag, 6,000 kg. | | New slags, 7,000 kg. | | Ashes, dust, 20,000 kg. | | Copper-iron, 10,000 kg. | | Total, 47,000 kg. | |
|---|---|---|---|---|---|---|---|---|---|---|---|---|
| | Weight, kg. | Percent by wt. | Weight, kg. | Percent by wt. | Weight, kg. | Percent by wt. | Weight, kg. | Percent by wt. | Weight, kg. | Percent by wt. | Weight, kg. | Percent by wt. |
| Cu | 2,000 | 50 | 360 | 6 | 2,100 | 30 | 6,000 | 30 | 2,000 | 20 | 12,460 | 26 |
| Sn | 280 | 7 | 60 | 1 | 140 | 2 | 200 | 1 | 20 | 0.2 | 700 | 1.5 |
| Pb | 120 | 3 | 120 | 2 | 280 | 4 | 400 | 2 | 50 | 0.5 | 970 | 2.1 |
| Zn | 80 | 2 | 1,200 | 20 | 700 | 10 | 4,000 | 20 | 500 | 5 | 6,480 | 14 |
| Fe | 320 | 8 | 600 | 10 | 700 | 10 | 1,200 | 6 | 6,000 | 60 | 8,820 | 19 |
| SiO₂ | 800 | [1] 20 | 960 | 16 | 1,260 | 18 | 1,600 | 8 | | | 5,020 | 11 |
| CaO | | | 500 | 8.33 | 350 | 5 | 2,000 | 10 | | | 2,350 | 5.0 |
| Ni | 320 | 8 | 30 | 0.5 | 14 | 0.2 | 100 | 05 | 20 | 0.2 | 484 | 1.0 |

[1] Si.

The furnace was rotated very slowly while the charge was melted under a neutral, oxygen-enriched flame. As the melting bath began to "glide" on the furnace wall, the furnace rotation speed was increased to about 3 r.p.m. As the bath became more liquid, the speed was gradually increased to about 17 r.p.m. During the melting period metallic zinc evaporated rapidly from the bath and was oxidized in the hood by air aspirated through the gap between the furnace mouth and the hood. The resultant dust was condensed and collected.

At the end of the melting period, a molten metal, slag and dust had been produced whose composition is set forth in Table II.

TABLE II

| Metal/flux | Charge, 47,000 kg. | | Dust 5,200 kg. | | Slags, 23,000 kg. | | Metal, 15,050 kg. | |
|---|---|---|---|---|---|---|---|---|
| | Weight, kg. | Percent by wt. | Weight, kg. | Percent by wt. | Weight, kg. | Percent by wt. | Weight, kg. | Percent by wt. |
| Cu | 12,460 | 26 | 61 | 1.17 | 259 | 1.13 | 12,140 | 80.67 |
| Sn | 700 | 1.5 | 122 | 2.35 | 122 | 0.53 | 456 | 3.03 |
| Pb | 970 | 2.1 | 244 | 4.69 | 147 | 0.64 | 579 | 3.85 |
| Zn | 6,480 | 14 | 3,050 | 58.65 | 2,590 | 11.26 | 840 | 5.59 |
| Fe | 8,820 | 19 | 120 | 2.31 | 8,252 | 35.88 | 448 | 2.98 |
| Ni | 484 | 1.0 | 12.2 | 0.23 | 31.8 | 0.14 | 440 | 2.93 |
| SiO₂ | 5,020 | 11 | 305 | 5.86 | 4,715 | 20.50 | | |
| CaO | 2,350 | 5.0 | 305 | 5.87 | 2,045 | 8.90 | | |

TABLE III

| Metal/flux | Dust, 1,100 kg. | | Slags, 23,000 kg. | | Metal, 16,400 kg. | |
|---|---|---|---|---|---|---|
| | Weight, kg. | Percent by wt. | Weight, kg. | Percent by wt. | Weight, kg. | Percent by wt. |
| Cu | 12.5 | 1.14 | 34.5 | 0.15 | 12,752 | 78.33 |
| Sn | 14.2 | 1.29 | 11.5 | 0.05 | 556.3 | 3.417 |
| Pb | 24 | 2.18 | 11.5 | 0.05 | 700.5 | 4.30 |
| Zn | 620 | 56.36 | 1,840 | 8 | 1,070 | 6.57 |
| Fe | 20 | 1.82 | 9,310 | 40.47 | 568 | 3.48 |
| Ni | 1 | 0.09 | 4.6 | 0.02 | 470.2 | 2.88 |
| SiO₂ | | | 4,715 | 20.5 | | |
| CaO | | | 2,045 | 8.89 | | |

After melting was complete, the furnace rotation speed was reduced to 3 r.p.m. and a sample taken. Based on the analysis of this sample, an additional 2000 kg. of copper/iron scrap was added to the furnace. The furnace speed was then increased to about 23 r.p.m. and the slag further reduced under a slightly reducing flame.

After about an hour the final reduction step was complete, as indicated by further slag analysis, and the melting slag was top poured into a small slag pan which overflowed into a cast iron launder. The launder discharged the slag into a water stream where it was granulated. The final melting slag analysis is shown in Table III, along with the composition of black copper remaining in the furnace and the dust produced in the final reduction step.

The black copper was next prerefined. As soon as the melting slag was poured, about 6.5 tons of yellow scrap were charged into the melting furnace along with 1000 kg. of silica and 500 kg. of burnt lime. About 15 minutes later another 9 tons of yellow scrap and 4 tons of radiators were charged. Composition of the prerefining charge is shown in Table IV.

TABLE IV

| Metal/flux | Black copper, 16,400 kg. | | Radiators, 4,040 kg. | | Yellow brass, 16,000 kg. | | Total, 36,800 kg. | |
|---|---|---|---|---|---|---|---|---|
| | Weight, kg. | Percent by wt. | Weight, kg. | Percent by wt. | Weight, kg. | Percent by wt. | Weight, kg. | Percent by wt. |
| Cu | 12,752 | 78.33 | 2,750 | 68 | 10,400 | 65 | 25,872 | 70 |
| Sn | 556.3 | 3.417 | 120 | 3 | 160 | 1 | 836.3 | 2.3 |
| Pb | 700.5 | 4.30 | 400 | 10 | 320 | 2 | 1,420.5 | 3.9 |
| Zn | 1,070 | 6.57 | 500 | 12.5 | 4,000 | 25 | 5,570 | 15 |
| Fe | 568 | 3.48 | 80 | 2 | 480 | 3 | 1,128 | 3.1 |
| Ni | 470.2 | 2.88 | | | 80 | 0.5 | 550.2 | 1.5 |
| SiO₂ | | | | | | | 1,000 | 2.7 |
| CaO | | | | | | | 500 | 1.4 |

The scrap in the prerefining bath was melted down with a strongly oxidizing flame. As soon as the bath was sufficiently molten that all metallics were "swimming" in the bath level, furnace speed was increased to about 23 r.p.m. Iron and zinc were oxidized. Iron oxide was slagged, while zinc oxide was partially slagged and partially vaporized out of the furnace. At the end of the prerefining period a black copper, dust, and prerefining slag had been produced whose compositions are shown in Table V.

TABLE V

| Metal/flux | Charge, 36,800 kg. | | Dust, 4,200 kg. | | Slags, 6,000 kg. | | Metal, 30,000 kg. | |
|---|---|---|---|---|---|---|---|---|
| | Weight, kg. | Percent by wt. | Weight, kg. | Percent by wt. | Weight, kg. | Percent by wt. | Weight, kg. | Percent by wt. |
| Cu | 25,872 | 70 | 39.9 | 0.95 | 300 | 5.0 | 25,532.1 | 85.12 |
| Sn | 836.3 | 2.3 | 46.2 | 1.1 | 60 | 1.0 | 730.1 | 2.43 |
| Pb | 1,420.5 | 3.9 | 109.2 | 2.6 | 120 | 2.0 | 1,191.3 | 3.97 |
| Zn | 5,570 | 15 | 2,604 | 62 | 1,200 | 20 | 1,766.03 | 5.88 |
| Fe | 1,128 | 3.1 | 117.6 | 2.8 | 900 | 15 | 110.4 | 0.37 |
| Ni | 550.2 | 1.5 | 8.4 | 0.2 | | | 541.8 | 1.80 |
| SiO₂ | 1,000 | 2.7 | | | 1,000 | 16.66 | | |
| CaO | 500 | 1.4 | | | 500 | 8.33 | | |

The prerefining slag was poured into a ladle to be held for subsequent charge to a later melting furnace batch. The black copper was poured into another ladle and held for transfer to the refining furnace.

The refining furnace was then charged with 10 tons of black copper recovered from the refining slags of a previous heat, 15 tons of radiators, and the black copper from the melting furnace. Composition of the refining furnace metal charge is shown in Table VI.

TABLE VI

| Metal/flux | Black copper, 30,000 kg. | | Recycled black, copper, 10,000 kg. | | Radiators, 15,000 kg. | | Total, 55,000 kg. | |
|---|---|---|---|---|---|---|---|---|
| | Weight, kg. | Percent by wt. | Weight, kg. | Percent by wt. | Weight, kg. | Percent by wt. | Weight, kg. | Percent by wt. |
| Cu | 25,532 | 85.12 | 8,200 | 82 | 10,200 | 68 | 43,952 | 80 |
| Sn | 730 | 2.43 | 600 | 6 | 450 | 3 | 1,780 | 3.3 |
| Pb | 1,191.3 | 3.97 | 300 | 3 | 1,500 | 10 | 2,991.3 | 5.5 |
| Zn | 1,766 | 5.88 | | | 1,875 | 12.5 | 3,641 | 6.6 |
| Fe | 110.4 | 0.37 | | | 300 | 2 | 410.4 | 0.7 |
| Ni | 541.8 | 1.80 | 500 | 5 | | | 1,041.8 | 1.9 |
| Sb | 180.0 | 0.60 | 120 | 1.2 | 30 | 0.2 | 330 | 0.6 |
| SiO$_2$ | 00 | Flux | | | | | | |

To the metal thus charged was added 1500 kg. of silica flux.

The radiators were melted under a strong oxidizing flame while the furnace was rotated at about 23 r.p.m. During this period the furnace temperature was brought up to about 1180° C. and a substantial quantity of zinc oxide was volatilized. At the end of the melting period, the first refining slag, rich in zinc and iron, was poured off into the slag retreating furnace. Composition of this slag and the metal and dust produced in melting the charge are shown in Table VII.

TABLE VII

| Metal/flux | Dust, 1,000 kg. | | Slags, 6,000 kg. | | Metal, 51,000 kg. | |
|---|---|---|---|---|---|---|
| | Weight, kg. | Percent by wt. | Weight, kg. | Percent by wt. | Weight, kg. | Percent by wt. |
| Cu | 20 | 2 | 360 | 6 | 43,552 | 85.39 |
| Sn | 20 | 2 | 120 | 2 | 1,640 | 3.21 |
| Pb | 60 | 6 | 180 | 3 | 2,751.3 | 5.39 |
| Zn | 600 | 60 | 1,560 | 26 | 1,481.0 | 2.90 |
| Fe | 10 | 1 | 300 | 5 | 100.4 | 0.20 |
| Ni | 2 | 0.2 | 24 | 0.4 | 1,015.8 | 1.99 |
| Sb | 8 | 0.8 | 12 | 0.2 | 310 | 0.61 |
| SiO$_2$ | 10 | 1 | 1,490 | 24.8 | | |

After the first refining slag was poured, 5 more tons of radiators and 5 tons of red brass were charged to the furnace along with 2 tons of silica flux. Composition of the melt at this point is set forth in Table VIII.

TABLE VIII

| Metal/flux | Black copper, 51,000 kg. | | Radiators, 5,000 kg. | | Red brass, 5,000 kg. | | Total, 61,000 kg. | |
|---|---|---|---|---|---|---|---|---|
| | Weight, kg. | Percent by wt. | Weight, kg. | Percent by wt. | Weight, kg. | Percent by wt. | Weight, kg. | Percent by wt. |
| Cu | 43,552 | 85.39 | 3,400 | 68 | 4,000 | 80 | 50,952 | 83.53 |
| Sn | 1,640 | 3.21 | 150 | 3 | 150 | 3 | 1,940 | 3.18 |
| Pb | 2,751.3 | 5.39 | 500 | 10 | 300 | 6 | 3,551.3 | 5.82 |
| Zn | 1,481 | 2.90 | 625 | 12.5 | 350 | 7 | 2,456 | 4.03 |
| Fe | 100.4 | 0.20 | 100 | 2 | 25 | 0.5 | 225.4 | 0.37 |
| Ni | 1,015.8 | 1.99 | | | 25 | 0.5 | 1,025.8 | 1.68 |
| Sb | 310 | 0.61 | 10 | 0.2 | | | 320 | 0.52 |

An oxygen lance was then introduced into the furnace and the mass was blown with 1200 standard cubic feet per minute of oxygen for a period of 30 minutes. Furnace rotation speed was about 23 r.p.m. At the end of the first blowing period, a second refining slag was poured off. The composition of this slag, the metal remaining in the furnace and the dust produced during the first blowing are shown in Table IX.

TABLE IX

| Metal/flux | Dust, 1,150 kg. | | Slags, 7,500 kg. | | Metal, 55,800 kg. | |
|---|---|---|---|---|---|---|
| | Weight, kg. | Percent by wt. | Weight, kg. | Percent by wt. | Weight, kg. | Percent by wt. |
| Cu | 30 | 2.61 | 667.80 | 9.04 | 50,244.2 | 90.04 |
| Sn | 26 | 2.26 | 681.75 | 10.32 | 1,232.25 | 2.21 |
| Pb | 80 | 6.96 | 980.25 | 14.08 | 2,491.05 | 4.46 |
| Zn | 600 | 52.17 | 1,733.20 | 28.77 | 122.80 | 0.22 |
| Fe | 16 | 1.39 | 209.40 | 3.59 | | |
| Ni | 12 | 1.04 | 58.80 | 1.0 | 955 | 1.71 |
| Sb | 32 | 2.78 | 38.75 | 0.62 | 249.25 | 0.45 |
| SiO$_2$ | 28 | 2.43 | 1,978 | 26.37 | | |

Another 10 tons of red brass were then charged, along with 3750 kg. of silica. Composition of the melt at this point is shown in Table X.

TABLE X

| Metal/flux | Metal, 55,800 kg. | | Red brass, 10,000 kg. | | Total, 65,800 kg. | |
|---|---|---|---|---|---|---|
| | Weight, kg. | Percent by wt. | Weight, kg. | Percent by wt. | Weight, kg. | Percent by wt. |
| Cu | 50,244.2 | 90.04 | 8,200 | 82 | 58,444.2 | 98 |
| Sn | 1,232.25 | 2.21 | 300 | 3 | 1,532.25 | 2.3 |
| Pb | 2,491.05 | 4.46 | 600 | 6 | 3,091.05 | 4.7 |
| Zn | 122.80 | 0.22 | 700 | 7 | 822.80 | 1.3 |
| Fe | | | 160 | 2 | 160 | 0.2 |
| Ni | 955.0 | 1.71 | | | 955 | 1.5 |
| Sb | 249.25 | 0.45 | 16 | 0.2 | 265.25 | 3.9 |

Oxygen blowing was then resumed for about an hour with the furnace rotating at 23 r.p.m. Midway through this blowing period, the slag was skimmed off and 1750 kg. of silica was added. At the end of the blowing period the slag was again poured off. The composite composition of the slag removed and the metal remaining are shown in Table XI.

TABLE XI

| Metal/flux | Metal before blow, 65,800 kg. | | Slags, 15,000 kg. | | | Metal after blow, 57,000 kg. | | |
|---|---|---|---|---|---|---|---|---|
| | Weight, kg. | Percent by wt. | Weight, kg. | Percent by wt. | Percent distribution | Weight, kg. | Percent by wt. | Percent distribution |
| Cu | 58,442.2 | 89 | 2,250 | 15 | 3.85 | 56,192.2 | 98.58 | 96.15 |
| Sn | 1,532.25 | 2.3 | 1,532 | 10.21 | 100 | | | |
| Pb | 3,091.05 | 4.7 | 3,000 | 20 | 97.06 | 91 | 0.16 | 2.94 |
| Zn | 822.80 | 1.3 | 822.8 | 5.48 | 100 | | | |
| Fe | 160 | 0.2 | 160 | 1.07 | 100 | | | |
| Ni | 955 | 1.5 | 455 | 3.03 | 47.64 | 500 | 0.87 | 52.36 |
| Sb | 265.25 | 3.9 | 200 | 1.33 | 75.40 | 65.25 | 0.12 | 24.60 |
| SiO$_2$ | | | 3,750 | 25 | 100 | | | |

At this point, the temperature of the melt had risen to 1200° C. Six tons of dry scrapped anodes were then charged to the furnace along with 1000 kg. of silica flux. Oxygen blowing was resumed for 20 minutes at the same high furnace speed. At the end of this period a final refining slag was poured off, leaving a refined slightly overblown copper in the furnace. Composition of the final slag and the refined copper are shown in Table XII.

TABLE XII

| Metal/flux | Liquid metal, 57,000 kg. | | Anode scrap, 6,000 kg. | | Slags, 6,000 kg. | | Refined copper, 59,900 kg. | |
|---|---|---|---|---|---|---|---|---|
| | Weight, kg. | Percent by wt. | Weight, kg. | Percent by wt. | Weight, kg. | Percent by wt. | Weight, kg. | Percent by wt. |
| Cu | 56,192 | 98.58 | 5,910 | 98.5 | 3,000 | 50 | 59,102 | 98.70 |
| Sn | | | | | | | | |
| Pb | 91 | 0.16 | | | 50 | 0.83 | 41 | 0.07 |
| Zn | | | | | | | | |
| Fe | | | | | | | | |
| Ni | 500 | 0.87 | | | 200 | 3.33 | 300 | 0.50 |
| Sb | 65.25 | 0.12 | | | 25 | 0.42 | 40.25 | 0.07 |
| SiO$_2$ | | | | | 1,000 | 16.67 | | |

After the final slag was poured, the furnace atmosphere was changed to a reducing atmosphere, using a weak yellow flame. Timbers were charged to the furnace until analysis showed that copper oxides contained in the melt had been reduced and that an anode-grade copper had been produced. The copper was then poured and cast into anodes.

Example 2

4000 kg. of copper/aluminum alloy, 1000 kg. of copper/iron scrap, and 1000 kg. of burnt lime were charged to the slag retreating furnace and melted along with the skulls from the slag ladles from the previous heat. The slag retreating furnace then received the refining slags produced in Example 1 as they were poured off of the refining furnace. After the first refining slag was received, furnace speed was increased to about 20 r.p.m. Furnace temperature was about 1180° C. Composite composition of the slag retreatment furnace charge is shown in Table XIII.

TABLE XIII

| Metal/flux | Slags, 34,500 kg. | | Copper-aluminum alloy, 4,000 kg. | | Copper-iron, 1,000 kg. | | Total, 40,500 kg. | |
|---|---|---|---|---|---|---|---|---|
| | Weight, kg. | Percent by wt. | Weight, kg. | Percent by wt.[1] | Weight, kg. | Percent by wt. | Weight, kg. | Percent by wt. |
| Cu | 6,287.8 | 18.23 | 3,280 | 82 | 200 | 20 | 9,767.8 | 24 |
| Sn | 2,334 | 6.76 | 40 | 1 | 2 | 0.2 | 2,376 | 5.9 |
| Pb | 4,286 | 12.42 | 80 | 2 | 5 | 0.5 | 4,371 | 11 |
| Zn | 4,540 | 13.16 | 240 | 6 | 50 | 5 | 4,830 | 12 |
| Fe | 729 | 2.11 | | | 600 | 60 | 1,329 | 3.3 |
| Ni | 738 | 2.14 | | | 2 | 0.2 | 740 | 1.8 |
| Sb | 276 | 0.8 | | | | | 276 | 0.7 |
| SiO$_2$ | 8,218 | 23.82 | | | | | 8,218 | 20 |
| CaO | | | | | | | 1,000 | 1.5 |

[1] Aluminum=8%.

45 minutes after the last slag was added, the furnace was bottom-tapped and a black copper allowed to flow into a metal ladle from whence it was recycled to the refining furnace. The compositions of the black copper tapped, the extracted slag remaining in the furnace, and the dust produced in the first phase of slag retreatment are shown in Table XIV.

TABLE XIV

| Metal/flux | Charge, 40,500 kg. | | Dust, 2,000 kg. | | Slag, 29,500 kg. | | Metal, 10,500 kg. | |
|---|---|---|---|---|---|---|---|---|
| | Weight, kg. | Percent by weight | Weight, kg. | Percent by weight | Weight, kg. | Percent by weight | Weight, kg. | Percent by weight |
| Cu | 9,767.8 | 24 | 40 | 2 | 385 | 3 | 8,842.8 | 84.22 |
| Sn | 2,376 | 5.9 | 20 | 1 | 1,915 | 6.50 | 441 | 4.2 |
| Pb | 4,371 | 11 | 160 | 8 | 3,885 | 13.17 | 326 | 3.1 |
| Zn | 4,830 | 12 | 1,100 | 55 | 3,730 | 12.64 | | |
| Fe | 1,329 | 3.3 | | | 1,329 | 4.50 | | |
| Ni | 740 | 1.8 | | | 110 | 0.37 | 630 | 6 |
| Sb | 276 | 0.7 | 40 | 2 | 150 | 0.51 | 86 | 0.82 |
| SiO$_2$ | 8,218 | 20 | | | 8,218 | 27.86 | | |
| CaO | 1,000 | 2.5 | 100 | 5 | 900 | 3.40 | | |
| Al$_2$O$_3$ | 604 | 1.5 | | | 604 | 2.05 | | |

After the black copper was tapped, 5000 kg. of approximately 98% iron scrap were charged to the furnace. The furnace was rotated at about 20 r.p.m. while lead and tin were reduced from the slag. After 20 minutes of reaction the resultant spent slag was poured into ladles and the lead/tin metal was poured for further processing. Compositions of metal, spent slag, and dust produced in the second phase of the slag retreatment furnace operation are shown in Table XV.

TABLE XV

| Metal/flux | Dust, 1,200 kg. | | Slags, 26,900 kg. | | Metal, 7,000 kg. | |
|---|---|---|---|---|---|---|
| | Weight, kg. | Percent by wt. | Weight, kg. | Percent by wt. | Weight, kg. | Percent by wt. |
| Cu | 24 | 2 | 13.4 | 0.05 | 457.5 | 13.54 |
| Sn | 24 | 2 | 134.5 | 0.50 | 1,756.5 | 25.10 |
| Pb | 102 | 8.5 | 134.5 | 0.50 | 3,648.5 | 52.12 |
| Zn | 744 | 62 | 2,876 | 10.10 | 110 | 1.57 |
| Fe | | | 5,719 | 21.26 | 210 | 3.00 |
| Ni | | | | | 110 | 1.57 |
| Sb | 24 | 2 | | | 126 | 1.80 |
| $SiO_2$ | | | 8,218 | 30.55 | | |
| CaO | | | 900 | 3.35 | | |
| $Al_2O_3$ | | | 604 | 2.25 | | |

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A process for recovering copper from copper-bearing materials which comprises the steps of:
    (a) melting copper-bearing materials in the presence of solid material containing metallic iron to form a melting bath including a slag phase;
    (b) substantially reducing any combined copper, lead, tin or nickel contained in the said copper-bearing materials to the elemental metallic state with solid-state metallic iron in the presence of a source of silica while subjecting the melting bath to a high degree of agitation sufficient to provide substantially uniform mass distribution within each liquid phase, substantially uniform temperature distribution throughout the melting bath, and high mass transfer rates between the slag phase and the metal phase, whereby vaporization of a major proportion of any lead or tin present is avoided and a black copper and a melting slag containing iron silicate are produced;
    (c) separating said melting slag from said black copper;
    (d) adding silica to said black copper to form a refining bath; and
    (e) blowing the black copper with oxygen while subjecting the refining bath to a high degree of agitation sufficient to provide substantially uniform mass distribution within each liquid phase, substantially uniform temperature distribution throughout the refining bath, and high mass transfer rates between the metal phase, the gas phase, and the phase containing silica so that metallic impurities of higher oxygen affinity than copper are selectively oxidized and rapidly absorbed by the phase containing silica while vaporization of major proportions of any lead oxide or tin oxides produced is prevented, thereby producing copper metal and a refining slag containing said impurities, including a major proportion of any significant quantities of lead or tin contained in the black copper.

2. The process set forth in claim 1 wherein said refining slag is subjected to further treatment which comprises the additional steps of:
    (f) mixing said refining slag with a solid material containing metallic iron to form a slag recovery bath;
    (g) selectively reducing combined copper contained in the slag portion of said slag recovery bath to the elemental metallic state with solid-state metallic iron while subjecting the slag recovery bath to a high degree of agitation sufficient to provide substantially uniform mass distribution within each liquid phase, substantially uniform temperature distribution throughout the slag recovery bath and high mass transfer rates between the slag phase and the liquid metal phase, thus promoting reoxidation by copper oxide of such lead or tin as may be temporarily reduced from any combined lead or tin contained in said refining slag and preventing the volatilization of major proportions of lead or tin compounds, thereby producing a black copper and an extracted slag of low copper content; and
    (h) separating said extracted slag from said black copper.

3. The process set forth in claim 2 wherein said extracted slag contains at least one compound selected from the group consisting of lead, tin and nickel and wherein said extracted slag is subjected to further treatment which comprises the steps of:
    (i) mixing said extracted slag with solid material containing metallic iron to form an extracted slag treating bath;
    (j) substantially reducing any compounds of copper, lead, tin or nickel contained in the slag portion of said extracted slag treating bath to the elemental metallic state with solid-state metallic iron while subjecting the extracted slag treating bath to a high degree of agitation sufficient to provide substantially uniform mass distribution within each phase, substantially uniform temperature distribution throughout the mixture, and high rates of mass transfer between the slag phase and the liquid metal phase, thus promoting the reduction of combined lead, tin, or nickel contained in the extracted slag, thereby producing a metal containing lead or tin and a spent slag containing low proportions of any copper, lead or tin contained in the refining slag; and
    (k) separating the metal containing lead or tin from the spent slag.

4. The process set forth in claim 1 wherein additional solid material containing metallic iron is charged to the melting bath after the copper-bearing materials are substantially completely molten, thereby to effect further reduction of any combined copper, lead, tin or nickel contained in the melting slag.

5. The process set forth in claim 2 wherein the black copper produced by reduction of combined copper contained in the refining slag is recycled and added to said refining bath prior to blowing the black copper contained therein with oxygen.

6. The process set forth in claim 1 wherein the melting bath and refining bath are each maintained at a temperature not substantially higher than about 1300° C.

7. The process set forth in claim 2 wherein the slag recovery bath is maintained at a temperature not substantially higher than about 1300° C.

8. The process set forth in claim 3 wherein the extracted slag treating bath is maintained at a temperature not substantially higher than about 1300° C.

9. The process set forth in claim 1 wherein the melting bath and the refining bath are each maintained at temperatures not substantially higher than the temperature at which the slags respectively contained therein become substantially fluid.

10. The process set forth in claim 2 wherein the slag recovery bath is maintained at a temperature not substantially higher than the temperature at which the slag contained therein becomes substantially fluid.

11. The process set forth in claim 3 wherein the extracted slag treating bath is maintained at a temperature not substantially higher than the temperature at which the slag contained therein becomes substantially fluid.

12. The process set forth in claim 1 wherein the melting slag contains an amount of silica or silicate which constitutes at least about 22% by weight calculated as silicon dioxide and the refining slag contains at least about 20% by weight of free silicon dioxide.

13. The process set forth in claim 2 wherein the solid material containing metallic iron is mixed with the refining slag in an amount such that the quantity of metallic iron present is not in substantial stoichiometric excess over the quantity of combined copper contained in said refining slag.

14. The process set forth in claim 1 wherein the copper contained in the refining bath is subjected to several successive blowings with oxygen, refining slags being withdrawn and silica and copper-bearing materials being added between oxygen blowings.

15. A process of recovering copper from copper-bearing materials which comprises the steps of:
  (a) melting copper-bearing materials under a neutral flame in a rotatable furnace in the presence of solid material containing metallic iron to form a melting bath including a slag phase, the furnace being rotated at low speed until the coefficient of friction between the melting bath and the furnace wall falls to the point that the melting bath can flow readily along the wall surface, and thereafter at a moderate to high speed;
  (b) substantially reducing any combined copper, lead, tin or nickel contained in the said copper-bearing materials to the elemental metallic state with solid-state metallic iron under a neutral to reducing flame in the presence of a source of silica while rotating the furnace at a speed sufficient to subject the said melting bath to a high degree of agitation sufficient to provide substantially uniform mass distribution within each liquid phase, substantially uniform temperature distribution throughout the melting bath, and high mass transfer rates between the slag phase and the metal phase, whereby vaporization of a major proportion of any lead or tin present is avoided and a black copper and a melting slag containing iron silicate are produced;
  (c) separating said melting slag from said black copper;
  (d) adding silica to said black copper to form a refining bath; and
  (e) blowing the black copper with oxygen in a rotatable furnace while rotating the furnace at a speed sufficient to subject the refining bath to a high degree of agitation sufficient to provide substantially uniform mass distribution within each liquid phase, substantially uniform temperature distribution throughout the refining bath, and high mass transfer rates between the metal phase, the gas phase, and the phase containing silica so that metallic impurities of higher oxygen affinity than copper are selectively oxidized and rapidly absorbed by the phase containing silica while vaporization of major proportions of any lead oxide or tin oxides produced is prevented, thereby producing copper metal and a refining slag containing said impurities, including a major proportion of any significant quantities of lead or tin contained in the black copper.

16. The process set forth in claim 15 wherein the said refining slag is subjected to further treatment which comprises the steps of:
  (f) mixing said refining slag with solid material containing metallic iron to form a slag recovery bath;
  (g) selectively reducing combined copper contained in the slag portion of said slag recovery bath to the elemental metallic state with solid-state metallic iron under a neutral to slightly reducing flame in a rotatable furnace while rotating the furnace at a speed sufficient to subject the slag recovery bath to a high degree of agitation sufficient to provide substantially uniform mass distribution within each liquid phase, substantially uniform temperature distribution throughout the slag recovery bath and high mass transfer rates between the slag phase and the liquid metal phase, thus promoting reoxidation by copper oxide of such lead or tin as may be temporarily reduced from the combined lead or tin contained in said refining slag and preventing the volatilization of major proportions of lead or tin compounds, thereby producing a black copper and an extracted slag of low copper content; and
  (h) separating said extracted slag from said black copper.

17. The process set forth in claim 16 wherein said extracted slag contains at least one compound selected from the group consisting of lead, tin and nickel, and wherein said extracted slag is subjected to further treatment which comprises the steps of:
  (i) mixing said extracted slag with solid material containing metallic iron to form an extracted slag treating bath;
  (j) substantially reducing any compounds of copper, tin, lead or nickel contained in the slag portion of said extracted slag treating bath to the elemental metallic state with solid-state metallic iron under a strongly reducing flame in a rotatable furnace while rotating the furnace at a speed sufficient to subject the extracted slag treating bath to a high degree of agitation sufficient to provide substantially uniform mass distribution within each liquid phase, substantially uniform temperature distribution throughout the extracted slag treating bath, and high mass transfer rates between the slag phase and the liquid metal phase, thus promoting the reduction of combined lead, tin or nickel contained in the extracted slag, thereby producing a metal containing lead or tin and a spent slag containing low proportions of any copper, lead or tin contained in the refining slag.

18. The process set forth in claim 15 wherein the melting bath and refining bath are each maintained at a temperature not substantially higher than about 1300° C.

19. The process set forth in claim 16 wherein the slag recovery bath is maintained at a temperature not substantially higher than about 1300° C.

20. The process set forth in claim 17 wherein the extracted slag treating bath is maintained at a temperature not substantially higher than about 1300° C.

21. The process set forth in claim 15 wherein the melting bath and the refining bath are maintained at temperatures not substantially higher than the temperatures at which the slags respectively contained therein become substantially fluid.

22. The process set forth in claim 16 wherein the slag recovery bath is maintained at a temperature not substantially higher than the temperature at which the slag contained therein becomes substantially fluid.

23. The process set forth in claim 17 wherein the extracted slag treating bath is maintained at a temperature not substantially higher than the temperature at which the slag contained therein becomes substantially fluid.

24. In a process for recovering copper from copper-bearing materials by
  reducing said copper-bearing materials to form a black copper, and
  blowing the black copper in the presence of silica to selectively oxidize and remove impurities of higher oxygen affinity than copper,
  the improvement which comprises initially melting said copper-bearing materials in the presence of solid material containing metallic iron to form a melting bath including a slag phase; and
  substantially reducing any combined copper, lead, tin or nickel contained in the said copper-bearing materials to the elemental metallic state with solid-state metallic iron in the presence of a source of silica while subjecting the melting bath to a high degree of agitation sufficient to provide substantially uniform mass distribution within each liquid phase, substantially uniform temperature distribution throughout the melting bath, and high rates of mass transfer between the slag phase and the metal phase, whereby vaporization of a major proportion of any lead or tin present is avoided and a black copper and a slag containing iron silicate are produced.

25. In a process for recovering copper from copper-bearing materials by
reducing said copper-bearing materials to form a black copper, and
oxidizing impurities in the black copper to produce a copper metal of anode grade,
the improvement which comprises adding silica to said black copper to form a refining bath; and blowing the black copper with oxygen at a temperature not substantially higher than the temperature at which the phase containing silica becomes substantially fluid, while subjecting the refining bath to a high degree of agitation sufficient to provide substantially uniform mass distribution within each liquid phase, substantially uniform temperature distribution throughout the refining bath, and high mass transfer rates between the metal phase, the gas phase and the phase containing silica, so that metallic impurities of higher oxygen affinity than copper are selectively oxidized and rapidly absorbed by the phase containing silica while vaporization of major proportions of any lead oxide or tin oxides produced is prevented, thereby producing copper metal and a refining slag containing said impurities, including a major proportion of any significant quantities of lead or tin contained in the black copper.

26. In a process for recovering copper from copper-bearing materials by
reducing said copper-bearing materials to form a black copper, and
refining the black copper, forming a slag containing the silicates of metals contained in the black copper which have a higher affinity for oxygen than copper,
the improvement which comprises mixing the said slag with solid material containing iron to form a slag recovery bath; selectively reducing combined copper contained in the slag portion of said slag recovery bath to the elemental metallic state with solid-state metallic iron while subjecting the slag recovery bath to a high degree of agitation sufficient to provide substantially uniform mass distribution within each phase, substantially uniform temperature distribution throughout the slag recovery bath, and high mass transfer rates between the slag phase and the liquid metal phase, thus promoting reoxidation by copper oxide of such lead or tin as may be temporarily reduced from any combined lead or tin contained in said slag, and preventing the volatilization of major proportions of lead or tin compounds, thereby producing a black copper and an extracted slag of low copper content; and separating said extracted slag from said black copper.

27. In a process as set forth in claim 26 wherein the said extracted slag is subjected to further treatment which comprises the steps of mixing said extracted slag with solid material containing metallic iron to form an extracted slag treating bath; substantially reducing any compounds of copper, lead, tin or nickel contained in the slag portion of said extracted slag treating bath to the elemental state with solid-state metallic iron while subjecting the extracted slag treating bath to a high degree of agitation sufficient to provide substantially uniform mass distribution within each phase, substantially uniform temperature distribution throughout the extracted slag treating bath, and high rates of mass transfer between the slag phase and the liquid metal phase, thus promoting the reduction of combined lead, tin or nickel contained in the extracted slag, thereby producing a metal containing lead or tin and a spent slag containing low proportions of any copper, lead or tin contained in the slag from the refining step; and separating the metal containing lead or tin from the spent slag.

28. A process of recovering metals selected from the group consisting of copper, lead, tin and nickel from slags containing such metals which comprises the steps of:
mixing such a slag with solid material containing metallic iron to form a bath;
substantially reducing any combined copper, lead, tin or nickel contained in said slag to the elemental metallic state with solid-state metallic iron while subjecting the bath to a high degree of agitation sufficient to provide uniform mass distribution within each liquid phase, uniform temperature distribution throughout the bath, and high rates of mass transfer between the slag phase and the liquid metal phase whereby vaporization of a major proportion of any lead or tin present is avoided and a metal containing copper, lead, tin or nickel and a depleted slag containing iron silicate are produced; and separating said metal from said depleted slag.

References Cited
UNITED STATES PATENTS

| | | | |
|---|---|---|---|
| 1,548,279 | 8/1925 | Pike | 75—72 X |
| 1,976,735 | 10/1934 | Kuzell | 75—74 X |
| 2,668,107 | 2/1954 | Gordon | 75—82 X |
| 2,758,022 | 8/1956 | Jordan | 75—76 |
| 805,835 | 11/1905 | Baggaley | 75—74 |
| 979,204 | 12/1910 | Rockey et al. | 75—76 |
| 1,125,164 | 1/1915 | Page et al. | 75—76 |
| 1,576,776 | 3/1926 | Merriss | 75—76 X |
| 1,886,903 | 11/1932 | Ralston et al. | 75—74 |
| 1,919,699 | 7/1933 | Leemans | 75—76 |
| 2,172,009 | 9/1939 | Kenny | 75—76 |
| 3,561,952 | 2/1971 | Greenberg | 75—76 |

L. DEWAYNE RUTLEDGE, Primary Examiner

J. E. LEGRU, Assistant Examiner

U.S. Cl. X.R.

75—72, 78, 82, 85